United States Patent [19]

Doctor

[11] Patent Number: 5,069,597
[45] Date of Patent: Dec. 3, 1991

[54] AUTOMATICALLY LOADING AND UNLOADING MECHANISM FOR FLAT REMOVABLE STORAGE ELEMENTS

[76] Inventor: Louis J. Doctor, 815 North Rd., Carlisle, Mass. 01741

[21] Appl. No.: 464,961

[22] Filed: Jan. 16, 1990

[51] Int. Cl.$^5$ .................................. B65G 59/06
[52] U.S. Cl. ........................ 414/788.7; 414/797.9; 360/98.04
[58] Field of Search ........... 414/280, 331, 417, 788.7, 414/797.9; 360/98.04, 98.05, 98.06

[56] References Cited

U.S. PATENT DOCUMENTS

| | | | |
|---|---|---|---|
| 4,255,073 | 3/1981 | Schöttle | 414/797.9 X |
| 4,654,732 | 3/1987 | Mesher | 360/98.05 |
| 4,688,124 | 8/1987 | Scribner et al. | 360/98.06 |
| 4,693,659 | 9/1987 | Burke et al. | 360/98.04 |
| 4,835,634 | 5/1989 | Ostwald | 414/788.7 X |

Primary Examiner—David A. Bucci
Assistant Examiner—Craig Slavin
Attorney, Agent, or Firm—Wolf, Greenfield & Sacks, P.C.

[57] ABSTRACT

An automatic loading and unloading mechanism is provided for a flat removable storage element drive in general and for a floppy disk drive in particular. The mechanism has first and second hoppers or the like for holding elements or disks to be loaded and for holding unloaded elements respectively. A slide assembly is mounted between the two hoppers and is aligned with an element receiving slot in the drive. In response to a predetermined indication from the drive, the slide is moved in a direction perpendicular to and away from the element receiving slot and engages an ejected disk, pulling the disk from the slot as the slide assembly continues to move rearward. When the element is fully unloaded, a member, which normally supports the bottom element in the upper hopper, is cammed down to strike the top of the element being unloaded, causing this element to be moved into the second hopper. This also permits the bottom element in the first hopper to move into alignment with the slide and the element receiving slot. With such bottom element in alignment, the slide is moved in a direction perpendicular to and toward the slot, pushing the element ahead of it into the slot. The member is permitted to return to its raised position as the element starts to be loaded to support the remaining elements in the first hopper and to lift such elements off the elements being loaded.

18 Claims, 4 Drawing Sheets

AUTOMATICALLY LOADING AND UNLOADING MECHANISM FOR FLAT REMOVABLE STORAGE ELEMENTS

FIELD OF THE INVENTION

This invention relates to loading and unloading mechanisms for computer storage elements and more particularly to an automatic loading and unloading mechanism for flat removable storage elements, such as a 3.5 inch floppy disks.

BACKGROUND OF THE INVENTION

While most computers have internal memory devices and disk drives in which data and programs are stored, internal memory is generally not adequate for storing all of the software to be run on a computer and for storing all of the data which is stored in or generated by the computer. Further, internal memory is generally volatile, resulting in data stored in such memories being lost if, for any reason, the computer, or at least the memory portion thereof, does not receive electrical power for some period of time. Information stored in hard disk memory may also be lost or corrupted under some circumstances, such as if the hard disk is damaged. Internal memory and hard disks are also not readily portable, and are therefore not suitable for permitting programs and/or data on a computer to be sent to another facility or a back up location.

To provide the additional memory capacity, or in the event of fire, flood or the like at the computer facility, to provide a back up storage for programs and data to prevent the loss thereof, to provide program and data in a readily portable form and to permit archival records to be maintained, most computers have one or more floppy disk drives as built in or peripheral equipment on which such programs and data may be stored and from which programs and/or data may be read into the main computer memory. Typically, the user manually loads a blank floppy disk into the drive when back up or other write operations are to be performed, or loads a floppy disk containing desired information into the drive when a new program or new data (or previously stored programs or data which have been loaded onto a back up floppy disk) are to be read into main memory. This is an acceptable procedure so long as only a small number of floppy disks are required for a given write or read operation.

However, where for example 3.5 inch floppy disks are utilized, which is frequently the case for hard disk back-up, it may take up to three minutes, depending on the computer and disk drive being utilized, for a single floppy disk to be written onto during a back up operation, or for a single floppy disk to be read from during a restore operation, the loading of a long program or the loading of a substantial quantity of data. Since a large number of disks may be required to complete such an operation (in many cases ten or more), it is inconvenient for the operator to have to monitor the machine for a period which may run to over one hour to complete, for an entire back up or restore operation. It is therefore desirable that a mechanism be provided for permitting the disks to be automatically loaded and unloaded from the floppy disk drive during operations of this type so that such operations can be performed unattended, freeing the operator to perform other functions during this period, or permitting these functions to be performed at off hours when no operator is present.

While the desirability of such an automatic loading and unloading mechanism of computer media has been appreciated in the past, existing mechanisms for performing this function have been relatively complicated and expensive, the cost of such equipment rendering them suitable for use only with large systems, and precluding their use with smaller systems such as "personal computers (PC's)". However, personal computers are becoming increasingly prevalent in business applications where back up and restore operations are critical, and the software for such computers is becoming increasingly sophisticated, resulting in the need to load and unload large amounts of data into and out of such computers.

A need therefore exists for a relatively simple and inexpensive mechanism for automatically loading and unloading flat removable storage elements in general, and floppy disks in particular. Such mechanism should be particularly adapted for use with small computer systems such as, for example, PC's.

SUMMARY OF THE INVENTION

In accordance with the above, this invention provides an automatic loading and unloading mechanism for a flat removal storage element drive device, such as for example a 3.5 inch floppy disk drive. The mechanism has a means for holding elements to be loaded and for holding unloaded elements. This holding means preferably includes a first hopper for holding elements or disks to be loaded and a second hopper mounted below the first hopper for holding unloaded elements. A slide means is mounted between the first and second hoppers and is aligned with an element receiving slot in the drive. Engaging means, which may for example include fingers, are mounted to move with the slide means. In response to a predetermined indication from the drive that a storage element is to be unloaded, the slide is moved in a direction perpendicular to and away from the element receiving slot in the element drive and finger means engage the element to be unloaded, causing the element to be moved with the slide and thus unloaded. When the element is fully unloaded, a means is provided for causing the element to be dropped or otherwise moved into the second hopper. Suitable means are provided for normally engaging the bottom element held in the first hopper to support the element, such support means being moved out of engagement with the bottom element when the unloaded element is fully unloaded to permit such bottom element to drop or otherwise move into alignment with the slide means and the element receiving slot. When such bottom element has moved into alignment, the slide means is moved in a direction perpendicular to and toward the slot, and means are provided to push such bottom element ahead of the slide means into the slot.

The foregoing and other objects, features and advantages of the invention will be apparent from the following more particular description of a preferred embodiment of the invention as illustrated in the accompanying drawings.

DETAILED DESCRIPTION

Figure 1:
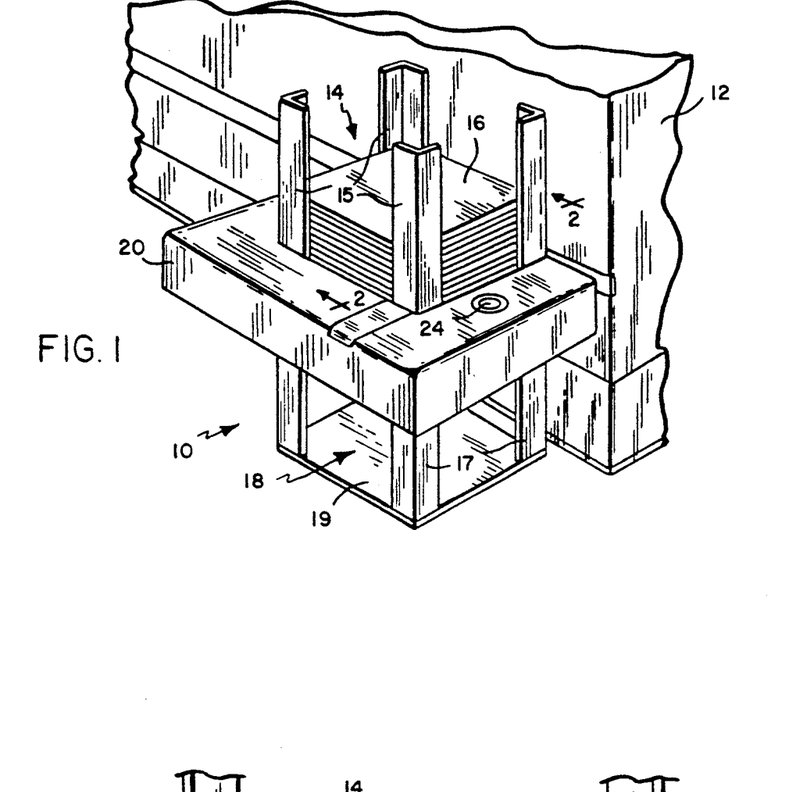
FIG. 1 is a top rear perspective view of an automatic disk loading and unloading mechanism in accordance with the teachings of this invention mounted adjacent the disk drive slot of a personal computer.

FIG. 1 shows the automatic disk loading and unloading mechanism 10 of this invention mounted to a unit 12 which may either be a computer having a built in floppy disk drive, or may be a stand alone disk drive. The mechanism 10 has an upper hopper 14 in which disks 16 to be loaded into the disk drive are loaded and a lower hopper 18 in which disks 16 which have been unloaded from the disk drive are deposited. Hopper 14 is defined by four corner brackets 15 and lower hopper 18 is defined by four corner brackets 17 and a bottom wall 19. Loading and unloading mechanism 20 is positioned between hoppers 14 and 18 and in line with a disk receiving slot 22 (FIG. 2) in unit 12. A start button 24 is located on the loading/unloading portion 20 of mechanism 10.

The exact manner in which mechanism 10 is mounted to unit 12 will vary with the nature of unit 12. For the preferred embodiment, there is a groove 25 (FIG. 2) near the bottom front of slot 22 which coacts with a clip 27 extending from the front of mechanism 20 to permit the mechanism 10 to be quickly and easily mounted to and removed from the unit 12 without the need for any tools or the like. For other units 12, where suitable flanges or the like are available, mechanism 10 may be clipped or clamped to the unit. Otherwise, it may be necessary to bolt the mechanism to the unit using either available holes in the unit or drilling suitable holes for this purpose. Other suitable attachment means might also be employed.

For the preferred embodiment of the invention, unit 12 is an Apple Macintosh II computer having a built in floppy disk drive and floppy disks 16 are 3.5 inch floppy disks which consist of a rotating floppy disk media mounted within a rigid cover. However, with suitable modification, some of which will be described later, the invention may be utilized with other computers and disk drives and with other types of disks.

Figure 2:
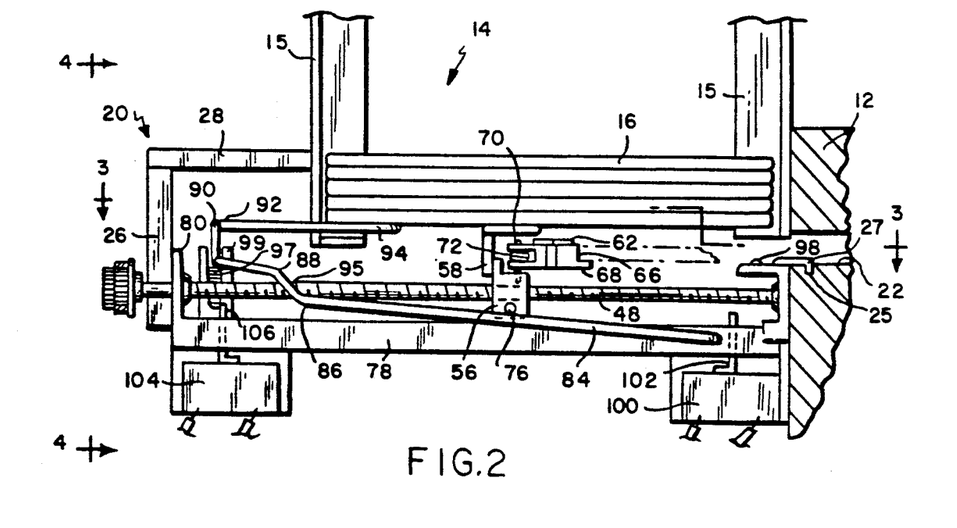
FIG. 2 is a cutaway side view of a top hopper and automatic disk loading and unloading mechanism of a preferred embodiment of the invention with the mechanism in its intermediate disk loading position.
Figure 3:
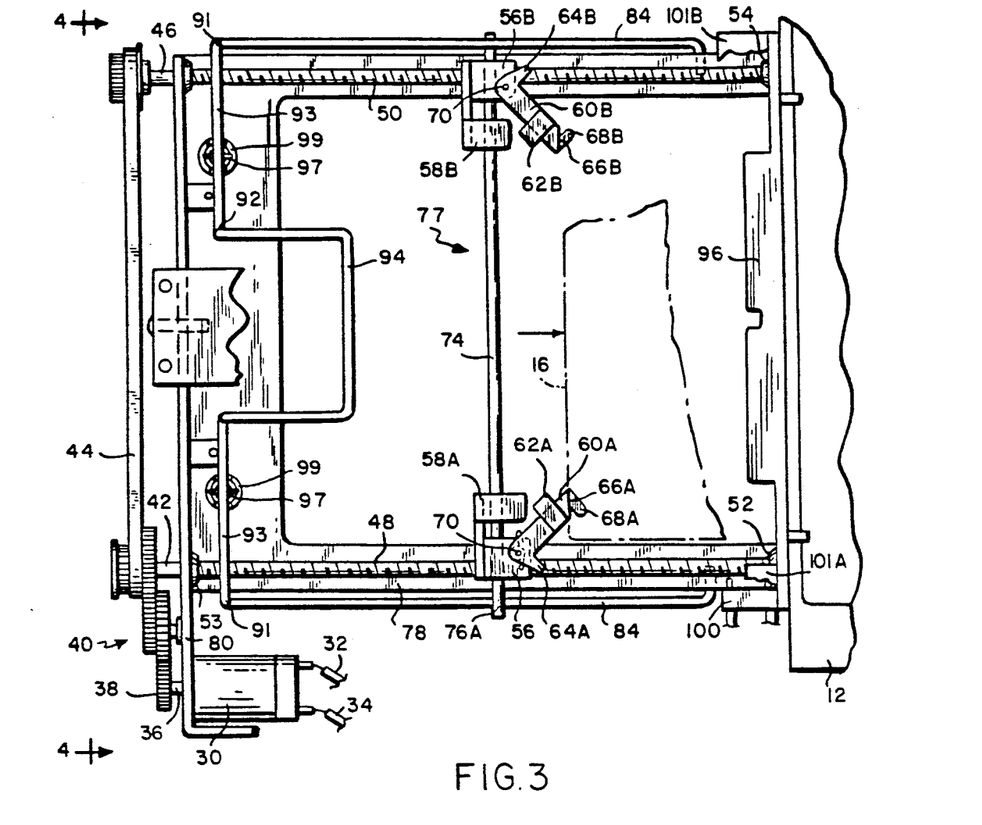
FIG. 3 is a top sectional view along the line 3—3 in FIG. 2 with the mechanism in the same disk loading position shown in FIG. 2.
Figure 4:
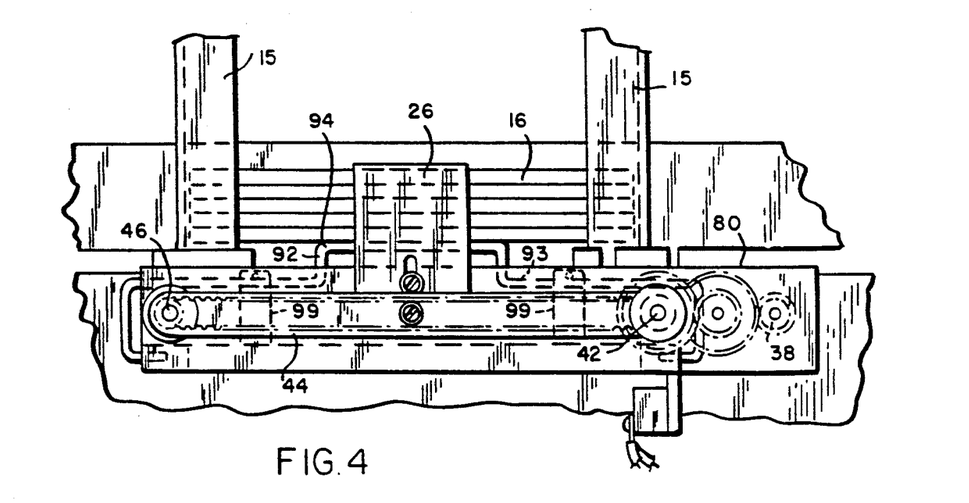
FIG. 4 is a back view partially cutaway along the line 4—4 in FIGS. 2 and 3.

Referring to FIGS. 2, 3 and 4, it is seen that hopper 14 extends into mechanism 20. Upper hopper 14 is supported at least in part by housing walls 26 and 28.

Within mechanism 20 is a motor 30 (FIG. 3.) having two input leads 32 and 34. Depending on the direction in which current is applied to the leads 32 and 34, motor 30 may rotate in either direction. Rotation of motor 30 is transmitted through shaft 36 and gear 38 to a step down gear mechanism 40 which drives shaft 42. Shaft 42 is connected by toothed timing belt 44 to shaft 46 so that the two shafts 42 and 46 rotate in synchronism.

Shafts 42 and 46 have worm gears 48 and 50 respectively attached to rotate therewith. Worm gears 48 and 50 are supported at their front ends in thrust bearings 52 and 54 respectively. Shafts 42 and 46, and the worm gears mounted thereto, are journaled at both ends with their near end being journaled (i.e., the end furthest from unit 12) in a housing member 78 having an upwardly extending rear wall 80. Motor 30 and gears 40 are also mounted to wall 80.

Each of the worm gears has a block 56 mounted thereon which moves towards and away from unit 12 as the corresponding worm gear (48, 50) is rotated either clockwise or counterclockwise. Each block 56 has a shelf 58 either formed as part thereof or welded or otherwise secured thereto which shelf projects above the block 56 and is adapted to provide vertical support to the bottom most disk 16 in upper hopper 14. Also mounted to each block 56 is a finger mechanism (60A, 60B). Each finger mechanism 60 has a tab or shelf (62A, 62B) extending from the top thereof and a projection (64A, 64B) extending outwardly from the end thereof mounted to block 56. The opposite end of finger 60 has an angled surface (66A, 66B) with a tab or shelf 68 extending from the bottom thereof. A gripper 63 of rubber or other suitable material is mounted to each finger 60 below each shelf 62. Finger 60 is mounted to block 56 by a shaft 70 and is adapted to rotate on the shaft. A torsion spring 72, also mounted on each shaft 70, normally biases each of the fingers 60 to the inward position shown in FIG. 3. A shaft 74 interconnects the blocks 56 and ends at a stud 76 extending beyond the end of each of the blocks 56. The blocks 56, shelves 58, finger mechanisms 60 and shaft 74 form a slide assembly 77 the functions of which will be described later.

A wire form 84 has its ends mounted for rotation on opposite sides of frame 78. Wire form 84 has arms extending from each mounting point at an upward angle toward the rear of mechanism 20 until a point 86 on the arm where the angle increases sharply over a short distance. At point 88 the angle of the arm returns to substantially its original angle until the back end of the wire form 84 is reached, at which point the form has an upwardly facing vertical section 90 which extends to point 91. Each ar then continues with a horizontal section 93 which extends to point 92. At point 92 the form 84 angles toward the front of the mechanism to form a forward facing shelf 94. Projecting studs 76 of shaft 74 are, as will be discussed later, adapted to coact with the sharply angled portion of each wire form arm between points 86 and 88 to cam the wire form 84 between a normal raised position and a lowered position. Wire form 84 is normally biased to its raised position shown in FIGS. 2 and 3 by compression springs 97 mounted in slotted tubes 99 which are attached to frame 78. Arm sections 93 of wire form 84 rest in the slots of tubes 99 and are biased to the raised position by springs 97.

A shelf 96 is provided which projects from the bottom front of slot 22. As will be discussed in greater detail later, the shelf 96 is utilized to support a disk 16 to be loaded into slot 22. Finally, the mechanism has a pair of studs or projections (101A, 101B) on each side of the front thereof which projections, as will be discussed in greater detail later, interact with the corresponding projections 64 on finger 60 to cam the finger from the normal position to which the finger is biased by torsion spring 72, which position is shown in FIG. 3, to the open or spread position for the fingers shown in FIG. 5A.

Figure 7:
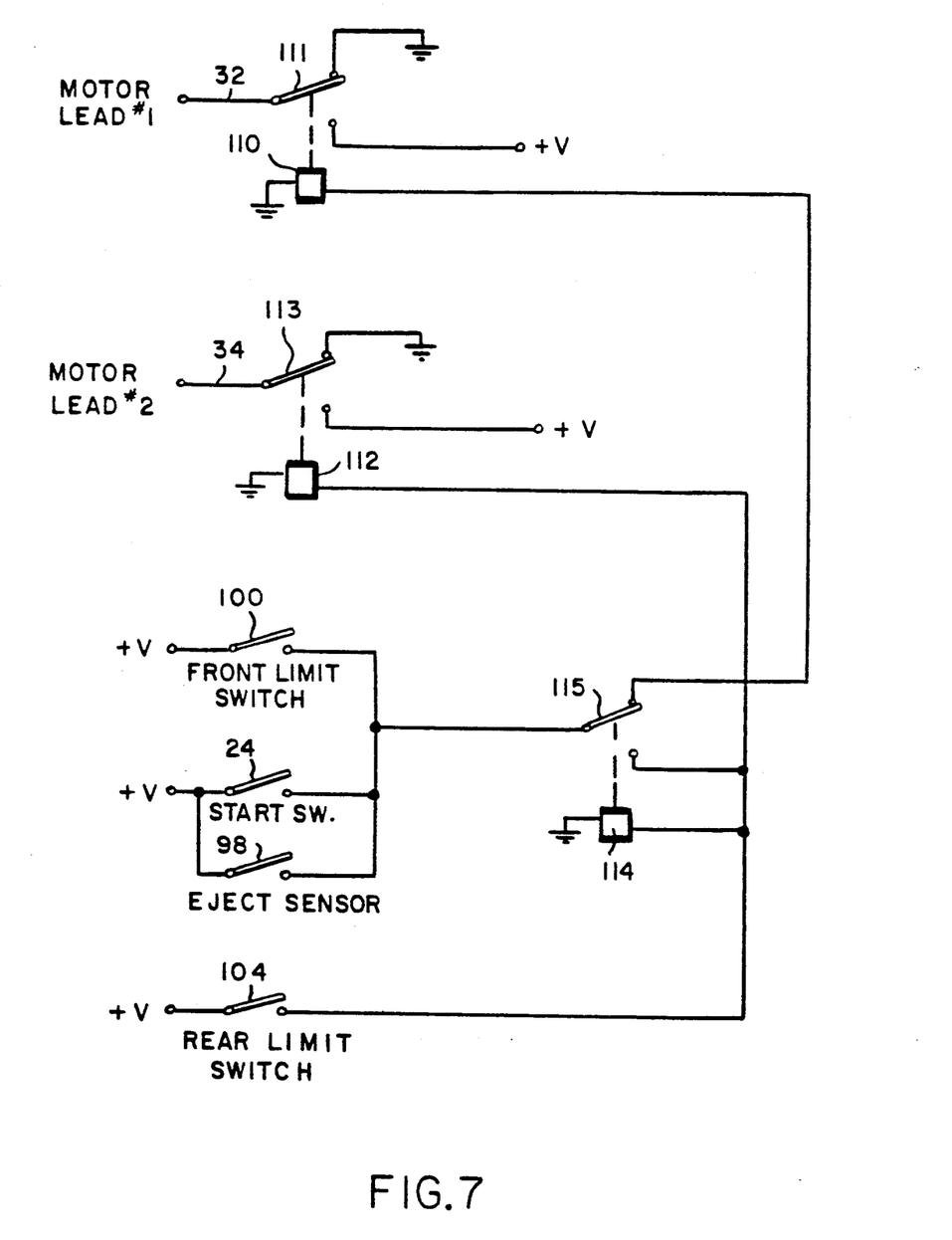
FIG. 7 is a schematic diagram of electrical control circuitry for the embodiment of the invention shown in the prior figures.

In addition to the mechanical elements described to this point, the mechanism also includes a normally-open eject sensor switch 98 which is closed when a disk 16 is ejected from slot 22, a front limit switch 100 which is normally closed but opens when block 56A makes physical contact with blade 102 of the switch and a rear limit switch 104 which is normally open but is closed when block 56A reaches the rear end of its travel and makes contact with blade 106 of the switch. Referring to FIG. 7, the switches 98, 100 and 104, as well as start switch 24, form part of the electrical control circuit for operating the disk loader/unloader mechanism 10. In addition to the switches, the circuit has three relays 110, 112 and 114. The contact blades 111 and 113 of relays 110 and 112 respectively are connected to motor leads 32 and 34, respectively, with the blades connecting the leads to ground when the corresponding relay is not energized and connecting the blade to a suitable source of positive potential when the relay is energized. The blade 115 of relay 114 is connected to the source of positive voltage through three parallel paths each of which paths contain one of start switch 24, eject sensor switch 98, and front limit switch 100. When relay 114 is not energized, its blade 115 is connected to a line leading to relay 110, causing this relay to be energized when one of the three switches in the parallel lines feeding the switch blade are closed. When relay 114 is energized, the blade 115 is transferred to a contact which is connected to both energize relay 112 and to maintain relay 114 energized. Relay 114 is also energized from a source of positive voltage through rear limit switch 104.

Figures 5A, 5B, 5C:
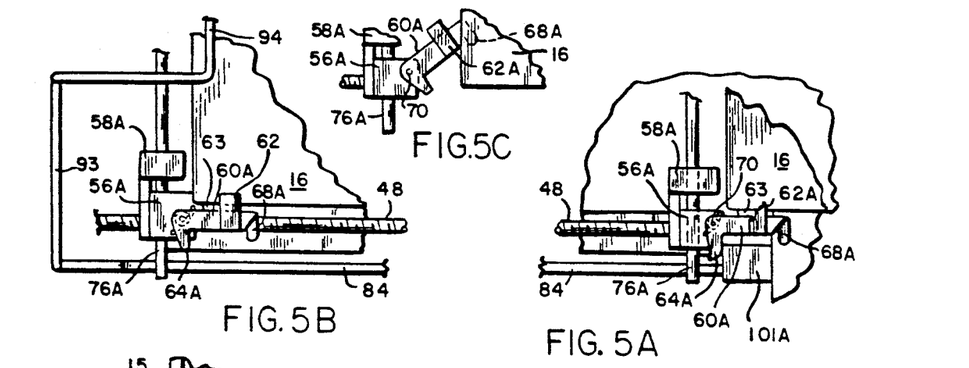
FIG. 5A is a partial top view of the mechanism of FIGS. 2 4 showing the mechanism at the beginning of a disk removal operation.
FIG. 5B is a partial top view of the same mechanism with a disk near the end of a disk removal cycle.
FIG. 5C is a partial top view of the same mechanism at the beginning of a new disk load operation.

In operation, slide assembly 77 is initially in the forward position shown in FIG. 5A. With the assembly in this position, studs 76 are out of contact with the arms of frame 84, resulting in the frame being in the raised position shown in FIG. 2. With the frame 84 in the raised position, shelf projection 94 supports the rear end of the lower most disk 16 in upper hopper 14. The forward end of this disk is supported on the horizontal shelf portions 58 of assembly 77. With the mechanism in this state, all of the switches shown in FIG. 7 are open as shown in this figure. This also results in all of the relays being de energized so that the relay contacts are also in the positions shown in FIG. 7. With ground on both of the motor leads 32 and 34, the motor is deactivated. Thus, initially there is nothing happening in the mechanism.

Action in the mechanism is initiated either by the user closing start switch 24 or by eject sensor 98 detecting that a disk has been ejected from slot 22. Assume initially that start switch 24 is closed. This causes a positive voltage to be applied through closed switch 24 and through open contact 115 of relay 114 to energize relay 110. Energizing relay 110 causes its contact 111 to be transferred to the positive voltage terminal, causing positive voltage to be applied to motor lead 32. This results in current flowing from lead 32, through motor 30, through lead 34 and open contact 113 of relay 112 to ground. Current flowing in this direction causes motor 30 to be driven in a direction to turn worm gears 48 and 50 such as to cause blocks 56 mounted thereon, and thus the slide assembly 77, to move in the rearward direction away from slot 20. Since no disk is being ejected from slot 22 at this time, once projections 64 on fingers 60 clear studs 101, the fingers are moved to the position shown in FIG. 3 by springs 72. As block 56A moves off contact blade 102, front limit switch 100 closes to apply positive voltage through contact 115 to continue the movement of motor 30 and to drive assembly 77 in its rearward direction, even if start button 24 is released.

As may be seen in FIG. 2, as assembly 77 moves backward, shelves 58 which support the front end of the lower most disk in hopper 14 move toward the rear of the disk, eventually permitting the forward end of the stack in hopper 14 in general, and the lower most disk of this stack in particular, to tilt downward. The rear end of the stack continues to be supported by shelf 94 of the wire form. However, at about the point in the rearward travel of the assembly 77 shown in FIGS. 5B and 6A, studs 76 make contact with the side arms of frame 84 at or just beyond the points 86 on the arms. This results in the wire form 84 being cammed sharply downward as studs 76 move along sections 95 between points 86 and 88 on each arm. By the time the projections 76 have reached the position on the arms of frame 84 shown in FIG. 6B, the top of shelf 94 is aligned with the bottom of slot 22. At this time, as is also seen in FIG. 6B, shelves 58 move beyond the end of the lower most disk in hopper 14. This permits the rear end of the lower most disk 16 in the stack in hopper 14 to drop until the disk is supported at its rea end by shelves 62 on fingers 60 and at its forward end by shelf 96 at the bottom of slot 22. As assembly 77 continues to move backwards to the position shown in FIGS. 5C and 6B, the rear end of the disk drops from shelves 62 to tabs 68. When in this position, the disk is aligned with slot 22 and supports the remaining disks in the upper hopper stack to prevent these disks from dropping any lower.

The movement of the slide assembly in the rearward direction continues until block 56A abuts contact blade 106 of rear limit switch 104 to close this switch. The closing of switch 104 causes positive voltage to be applied to relay 114 transferring its contact 115 to its enabled position (i.e. the position not shown in FIG. 7). In this position, the positive voltage being applied to the contact blade 115 through front limit switch 100 is applied both to energize relay 112 and to maintain the energization of relay 114. The transferring of contact blade 115 also removes positive potential from relay 110. The combination of relay 110 being de-energized and relay 112 being energized results in the polarity of the current applied to motor 30 being reversed (i.e., positive voltage being applied to lead 34 and ground potential being applied to lead 32) so that current flows through the motor in a direction from lead 34 to lead 32. The rotation of motor 30 in the opposite direction results in worm gears 48 and 50 also being turned in the opposite direction. This causes blocks 56, and the various elements mounted thereto to form assembly 77, to move in the forward direction towards slot 22.

As may be best seen in FIGS. 2 and 3, as the slide assembly 77 moves forward, the slanted surfaces 66 on each of the fingers 60 bear against the disk which is now resting on the tabs 68 and push this disk forward into slot 22. As the disk 16 resting on tab 68 is being pushed forward, it initially provides support for the portion of the stack of disks in hopper 16 positioned above it. However, by the time the assembly reaches the position shown in FIG. 6A, which is reached early in the forward movement of the assembly, wire form 84 is permitted to return to the normal raised position under the action of springs 97. This results in shelf 94 raising the rear end of the now lower most disk in hopper 14 slightly above the disk being loaded to reduce friction between the disks during loading. As the assembly continues to move forward, shelves 58 move under the lower most disk in the stack, and as the assembly 77 continues to move forward, the shelves 58 continue to support the stack of disks 16 in hopper 14 at increasingly more forward points raising more of the stack forward portion off the disk 16 being loaded until, as shown in FIG. 2, the entire stack is supported above this disk.

The edges 66 of fingers 60 continue to push the disk 16 into slot 22 until, near the end of the assembly 77 travel path, projections 64 on each of the fingers engage corresponding studs 101 on the mechanism frame. This causes the fingers to be quickly moved from the position shown in FIG. 3 to the position shown in FIG. 5A. This rapidly occurring forward movement by the fingers, which supplements the forward movement of the assembly 77, provides an extra forward kick to the disk 16 at the end of the disk travel path, which kicks the disk into slot 22, assuring proper seating of the disk in the slot.

At the safe time this is occurring, block 56A is engaging switch blade 102 to open front limit switch 100. This removes positive potential from both relays 112 and 114 returning the circuit of FIG. 7 to it initial condition shown in the figure.

Again, the mechanism remains in this condition with nothing happening until either start switch 24 is closed or eject sensor 98 is operated. Since a disk 16 has now been loaded into the disk drive mechanism, assume that the read or write operation with respect to this disk has been completed. For the preferred embodiment of the invention, where the system 12 is an Apple Macintosh II computer, when operation with respect to a given disk has been completed, the system automatically causes the disk to be ejected from slot 22. When this occurs, the ejection is detected by ejection detector 98, causing the detection switch to close and resulting in positive potential being applied through contact blade 115 to energize relay 110.

It should at this point be noted that while the Apple Macintosh II computer automatically ejects a disk 16 when operation on this disk is completed, not all PC's have this feature, and the availability of this feature is not a limitation on the invention. Other PC's operate to eject a disk in response to the operator pressing an eject button or other eject control in response to a visual, audio, or other indication from the PC or disk drive that a disk is to be unloaded. The operation of such a button may either mechanically eject the disk or may enable an electrical circuit to cause such ejection. The mechanism of this invention could be adapted to operate with such machines by providing a relay or other electrical device in the load/unload mechanism 10 which operates in response to a disk completed indication from the system to operate a hammer, solenoid, piston, or other appropriate mechanical member to act on the eject button or other control. Alternatively, where the eject control results in an electrical control signal, the mechanism could respond to an eject indication from the disk drive device to produce the required eject electrical signal. While this mode of operation is somewhat more complicated than that where the device 12 automatically ejects a disk, such operation is within the contemplation of the invention.

When relay 110 is operated, motor 30 is energized in the manner previously described to drive the slide assembly 77 in a direction away from slot 20. At this time, the ejected disk 16 is between the gripper pads 63 on fingers 60, but is not being grabbed by these fingers. As the slide assembly moves away from slot 20, projections 64 on the fingers move out of engagement with studs 101, permitting the fingers to move toward the position shown in FIG. 3 under the action of torsion springs 72. However, the fingers are prevented from returning to this position by the presence of disk 16 therebetween. This results in the grippers 63 pressing against the disk 16 therebetween to engage the disk and to cause the disk to be pulled from slot 22 as the assembly 77 continues to be moved in the rearward direction.

Figure 6A:
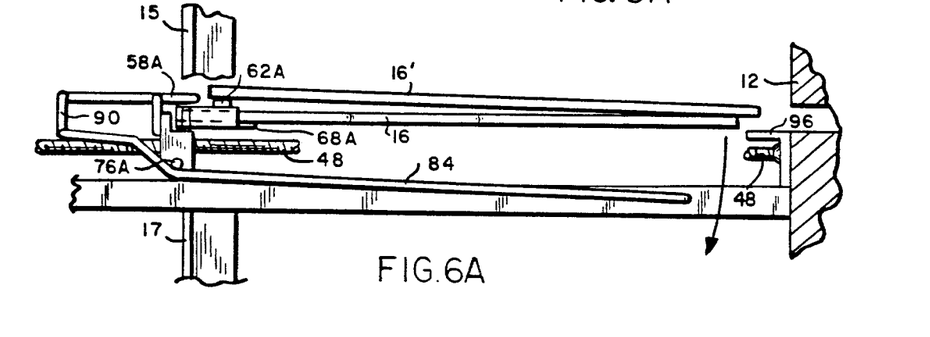
FIGS. 6A and 6B are cutaway side views of the mechanism of the preferred embodiment, respectively, at the point in the operation shown in FIG. 5B, and at the point shown in FIG. 5C where one disk is being dropped into the lower hopper and the bottom disk has fallen into place from the upper hopper.
Figure 6B:
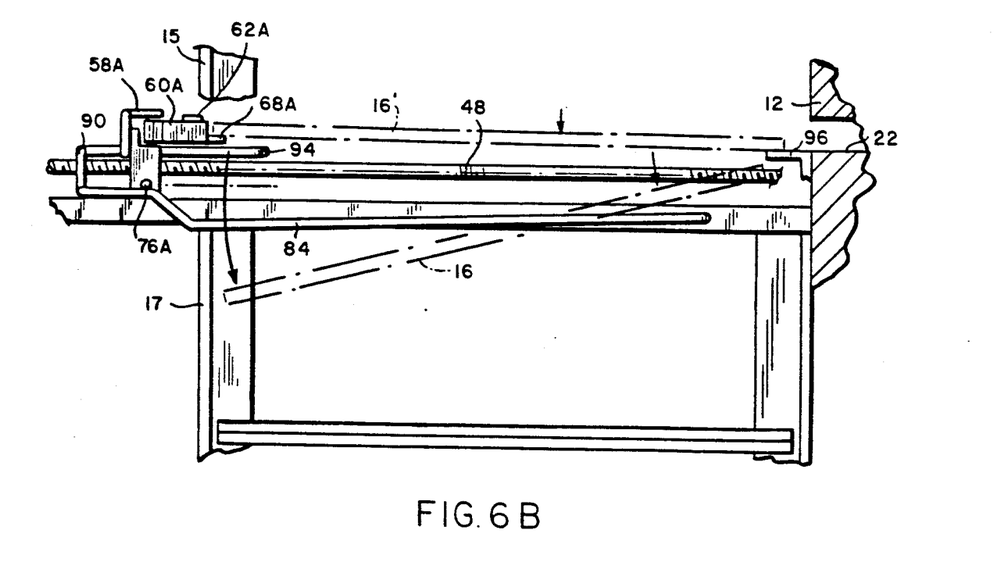

As the slide assembly reaches the position shown in FIGS. 5B and 6A, with the studs 76 at roughly point 86 along each arm of wire form 84, shelf 94 is positioned over the top surface of the disk being ejected while continuing to support the rear of the upper hopper stack, and shelves 58 are behind the stack, no longer providing support. As studs 76 continue to move backwards, they ride up the steeply slanted portion 95 of the wire form arms causing shelf 94 to be dropped sharply on the top of the disk being removed. At this point, the disk has been pulled clear of shelf 96. The striking of the disk by shelf 94 thus knocks the disk from between fingers 60 and permits the ejected disk to drop into hopper 18 as shown in FIG. 6B. As the ejected disk falls into hopper 18, the fingers 60 are permitted to return to the position shown in FIG. 3 under the action of torsion spring 72. As shown in FIGS. 5B and 6A, shoulders 62 are provided on the fingers 60 to assure that the bottom disk in the upper hopper stack does not fall between the fingers 60 before they have had an opportunity to return to the position shown in FIG. 3, and thus prevent the fingers from returning to this position. The next disk to be loaded thus initially rests on these shelves. By the time the assembly 77 reaches the end of its travel, with block 56A making contact with rear limit switch blade 106, the rear edge of the next disk to be loaded has dropped onto shelf or tab 68 on each of the fingers 60 in preparation for the next disk loading cycle.

The next disk loading cycle is performed in the manner previously described. The sequence of unloading disks which have been utilized and loading in new disks continues until all of the disks 16 originally loaded into upper hopper 14 have been loaded, utilized, and unloaded, at which time the process terminates with the mechanism in the position shown in FIG. 5A and the electrical system in the condition shown in FIG. 7. If, for example, during a memory hard disk back up operation, the back up of all information in the computer's memory is completed before all of the disks in hopper 14 have been utilized, the disk drive system can merely retain the last disk loaded, thereby terminating the loading operation, or other suitable means could be provided for terminating the operation before all of the disks in hopper 14 have been loaded.

A very simple and inexpensive disk loading and unloading mechanism is thus provided which, for the preferred embodiment, is mounted to the computer or disk drive with a single clip and is not otherwise physically or electrically connected to the disk drive or computer. The mechanism is thus very simple to install and remove. The device is also very simple to use in that it only requires loading the desired number of disks into upper hopper 14 and pressing start button 24. Once the operator completes these steps, the remainder of the operation is automatic.

While for the preferred embodiment, disks are loaded into hopper 14 and dropped into hopper 16 which are part of the mechanism, the disks could also be initially contained in a diskette, slide tray or the like which is mounted to the mechanism 20 and which may be removed and replaced by the user when empty. Hopper 16 could be replaced by a comparable receiving element which may be similarly removed and replaced when it is full of disks which have been used. The operation with this type of mechanism would be substantially the same as previously described.

Another option might be to provide a floppy disk cassette with each disk being mounted in a suitable shelf, and providing a suitable mechanism for indexing the cassette downward one position after each disk unload operation to align the next disk in the cassette with disk reader slot 22. The disk would be loaded and unloaded from the same cassette position with the cassette shelves presumably being wide enough to permit a much thinner slide assembly mechanism to pass therethrough. This mechanism would, for such an embodiment, be substantially simpler in that shelves 62 and 68 would not be required. The disk could be stripped from between fingers 60 by engaging a partial rear wall on the cassette, eliminating the need for wire form 84. The mechanism would otherwise be similar to that previously described.

Further, while for the preferred embodiment the disk slot 22 is horizontal, there are machines which the mechanism 10 might be required to work with where the disk slot is oriented vertically. An indexable cassette mechanism such as that described above would be suitable for use regardless of the orientation of the disk slot. It would be possible also to use a mechanism substantially similar to that shown for the preferred embodiment in the figures with vertically oriented disk slot if a spring mechanism or other suitable biasing mechanism is provided above the disks 16 in upper hopper 14 to provide an artificial "gravity" on such disks, and friction, a spring or other suitable retaining mechanism is utilized in lower hopper 18 to hold the disk in a desired orientation therein once the disks have been moved into this hopper as a result of the action of shelf 94 on the top thereof. Thus, for a vertical orientation, disks might be pushed down in hopper 18 as new disks are received therein rather than falling to the bottom as is the case for the preferred embodiment.

While the invention has been shown and described above with respect to a preferred mechanical and electrical configuration, it is apparent that various modifications could be made in both the mechanical and electrical components, and that various ones of the elements could be replaced with elements performing the same or a comparable function while still remaining within the invention. Thus, while the invention has been particularly shown and described above with reference to a preferred embodiment, the foregoing and other changes in form and detail may be made therein by one skilled in the art while still remaining within the spirit and scope of the invention.

What is claimed is:

1. An automatic loading and unloading mechanism for a flat removable storage element drive device, said drive device having an element receiving slot and providing a predetermined indication when a storage element is to be unloaded, comprising:

means for holding elements to be loaded and for holding unloaded elements;

a slide assembly positioned between he elements to be loaded and the unloaded elements and in alignment with said receiving slot;

an engaging mechanism mounted to move with said slide assembly;

means responsive to said predetermined indication for both moving said slide assembly in a direction generally perpendicular to and away from said slot and or causing said engaging mechanism to engage the element to be unloaded, said element moving with said slide assembly to be unloaded form said slot;

first means operative when said element is unloaded from said slot for both moving said element into the means for holding unloaded elements and for moving the bottom element to be loaded into alignment with the slide assembly and the slot; and second means operative when aid bottom element is in said alignment for moving said slide assembly in a direction generally perpendicular and toward said slot and to push said bottom element ahead of said slide assembly into said slot.

2. A mechanism as claimed in claim 1 wherein said means for holding includes separate first means for holding elements to be loaded and second means for holding unloaded elements, said first means operative moving unloaded elements into said second holding means.

3. A mechanism as claimed in claim 2 wherein said first and second holding means are first and second hoppers respectively, said second hopper being mounted below said first hopper, said first means operative causing said unloaded element to drop into said second hopper.

4. A mechanism as claimed in claim 3 including means for normally engaging the bottom element held in the first hopper to provide vertical support for such element, said first means operative including means for moving the means for normally engaging out of engagement with said bottom element to permit the bottom element to drop into alignment with the slide means and the slot.

5. A mechanism as claimed in claim 4 wherein said engaging mechanism includes finger means movable between first and second positions, said finger means having a first surface which, when said finger means is in its first position, contacts said bottom element to push it toward said slot.

6. A mechanism as claimed in claim 5 including means for normally biasing said finger means to its first position, and means operative when said slide means approaches a point where it has fully loaded said bottom element for moving the finger means to its second position.

7. A mechanism as claimed in claim 6 wherein said finger means is operative when moved from said first to said second positions to kick said bottom element beyond the end of said mechanism and into said slot.

8. A mechanism as claimed in claim 6 including gripper means on a second surface of said finger means which is adjacent to an element when said finger means is in its second position and an element is ejected, said predetermined indication responsive means including means for moving said gripper means into engagement with the element to be unloaded.

9. A mechanism as claimed in claim 8 wherein said means for moving the gripper means is operative when the slide assembly starts to move away from the slot, disabling the means for moving the finger to the second position, the gripper means engaging the element to be unloaded as the finger means starts to return to its first position.

10. A mechanism as claimed in claim 9 wherein said means for causing the unloaded element to drop includes means striking the element from above to knock it out from between said gripper means; and
   including a projection formed on the top of each finger means which continues to support said bottom element until the finger means have returned to their first position.

11. A mechanism as claimed in claim 4 including a pivotable member having a shelf projection which normally forms part of said means for providing vertical support; and means operative for interacting with said member to move the member to a lowered position as an element becomes fully unloaded, the shelf projection striking the top of the unloaded element as the member is lowered to cause the element to drop into the second hopper.

12. A mechanism as claimed in claim 11 including means operative when said slide assembly starts to push an element into the slot for raising the member to its normal position wherein said shelf projection supports and raises the elements in the upper hopper off the element being loaded.

13. A mechanism as claimed in claim 1 wherein said predetermined indication is the ejection of an element from said slot.

14. A mechanism as claimed in claim 1 wherein the means for moving the slide assembly includes a motor, said motor being driven in a first direction in response to said predetermined indication and being driven in a second opposite direction in response to said slide assembly reaching the end of its travel in a direction away from said slot; and means responsive to said motor being driven in the first direction for moving the slide assembly away from the slot and responsive to the motor being moved in the first direction for moving the motor toward the slot.

15. A mechanism as claimed in claim 14 wherein the means responsive to the motor includes a worm gear rotated by the motor, the slide assembly being mounted to move toward and away from the slot as the worm gear is rotated in opposition directions.

16. A mechanism as claimed in claim 14 including a start switch, and means responsive to the start switch being operated for driving the motor in said first direction.

17. A mechanism as claimed in claim 1 wherein said elements are floppy disks.

18. A mechanism as claimed in claim 17 wherein said elements are 3.5 inch floppy disks.

* * * * *